Oct. 27, 1959            A. C. HOWARD          2,910,129
DEPTH CONTROL MEANS FOR A ROTARY CULTIVATING MACHINE
Filed Dec. 12, 1955                            3 Sheets-Sheet 2
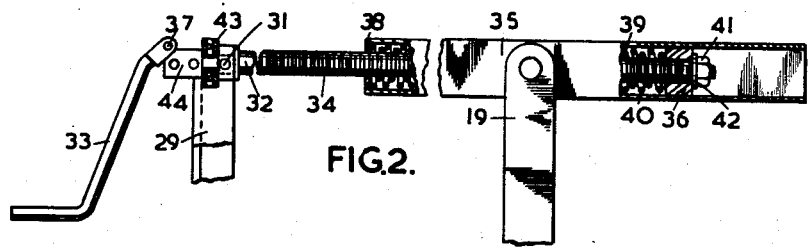
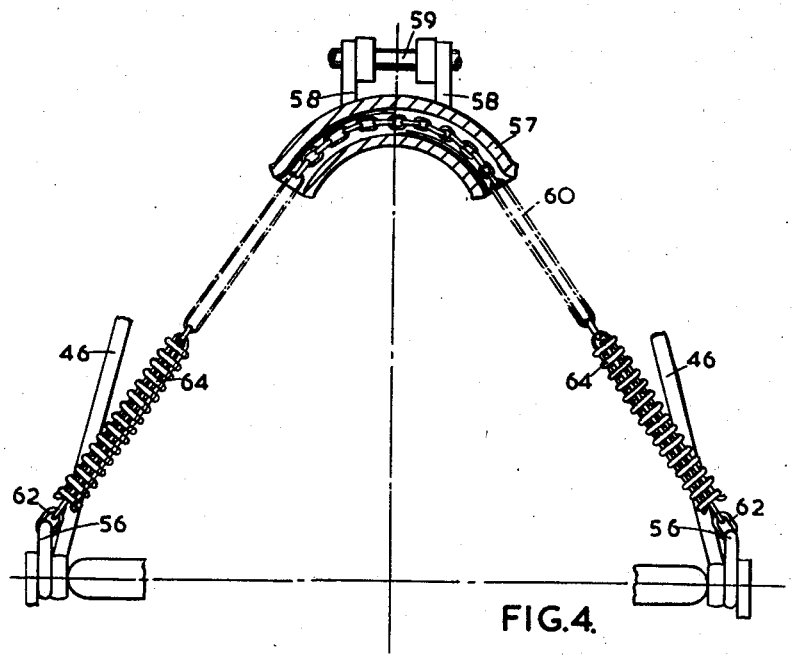
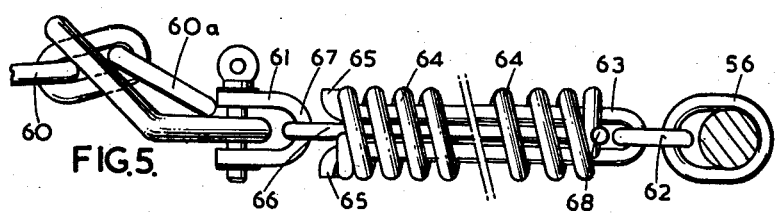
INVENTOR
A. C. HOWARD
By Mawhinney & Mawhinney
ATTYS.

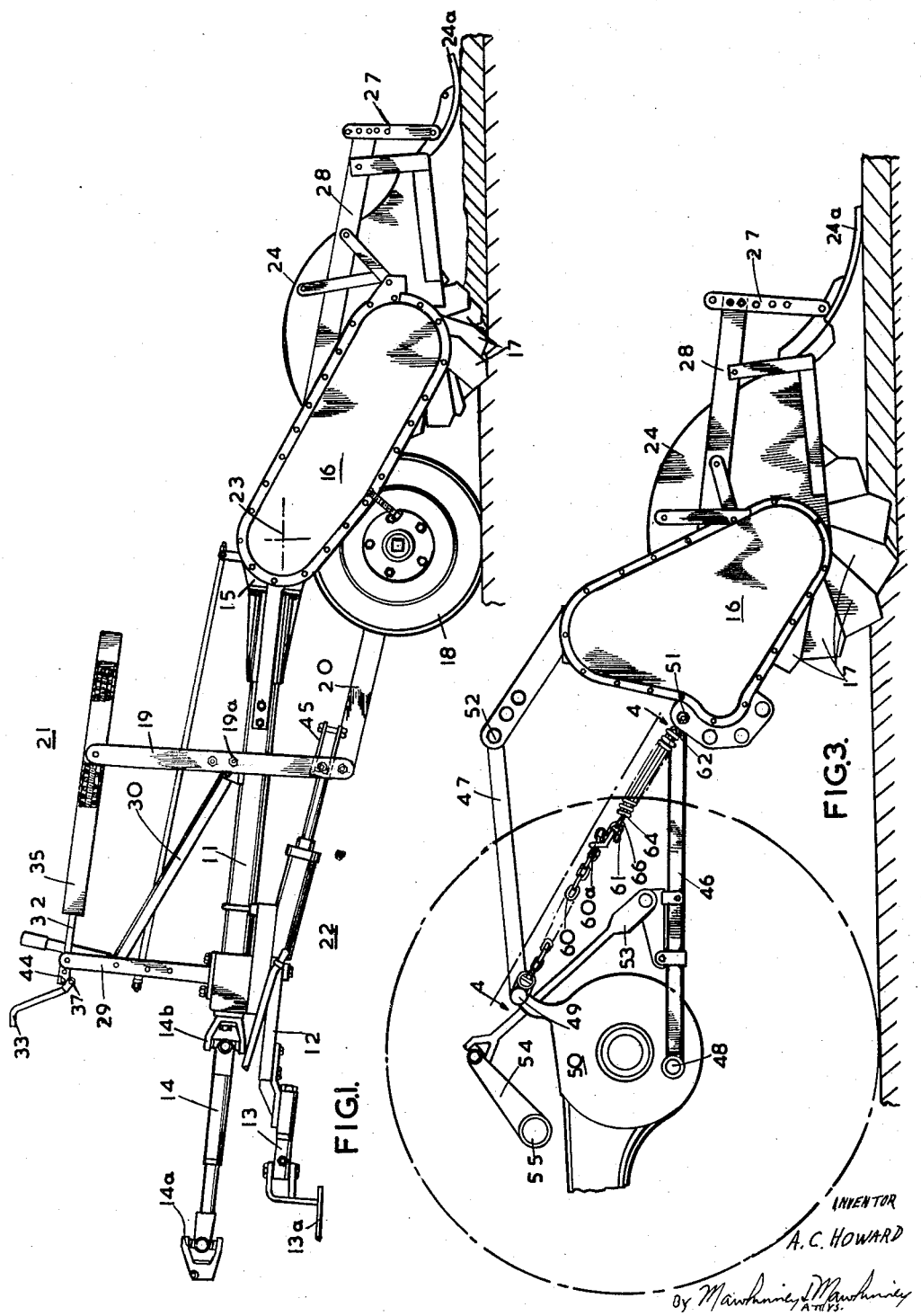

Oct. 27, 1959 A. C. HOWARD 2,910,129
DEPTH CONTROL MEANS FOR A ROTARY CULTIVATING MACHINE
Filed Dec. 12, 1955 3 Sheets-Sheet 3
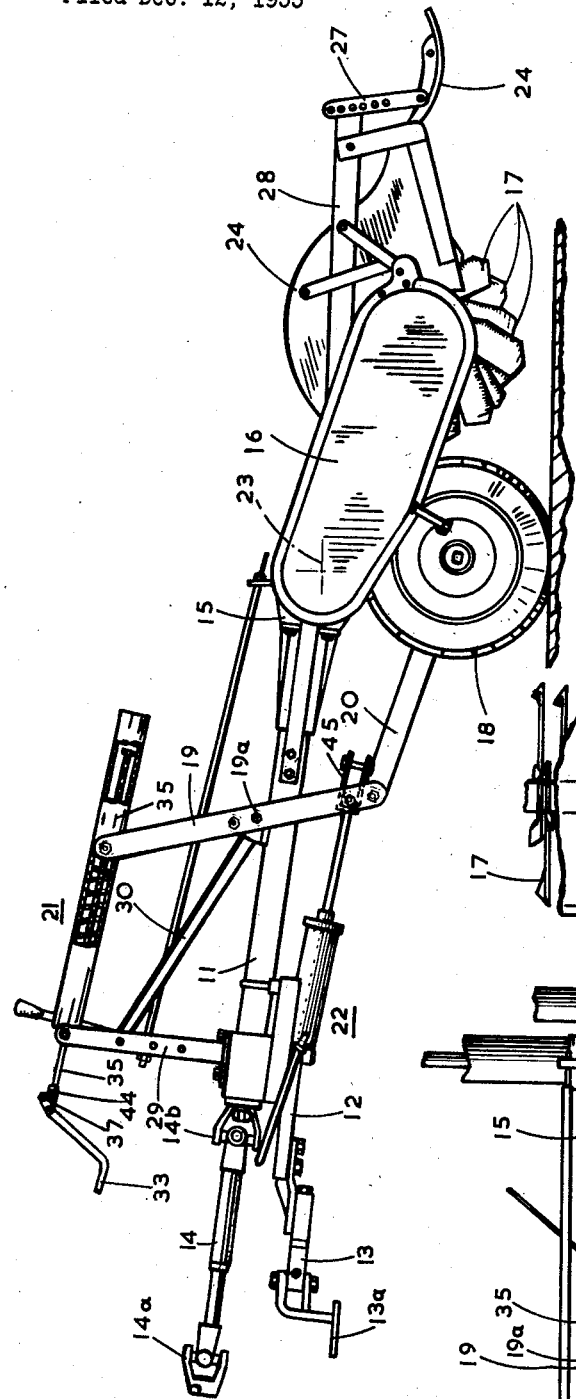
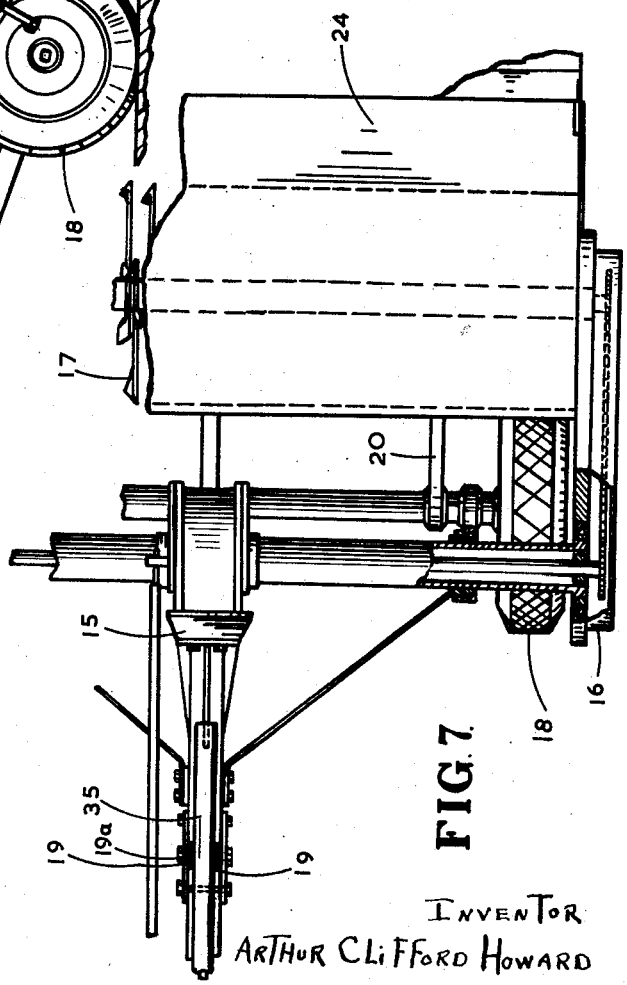
INVENTOR
ARTHUR CLIFFORD HOWARD
Mawhinney + Mawhinney
ATTORNEYS United States Patent Office 2,910,129
Patented Oct. 27, 1959

2,910,129

DEPTH CONTROL MEANS FOR A ROTARY CULTIVATING MACHINE

Arthur Clifford Howard, West Horndon, England, assignor to Rotary Hoes Limited, West Horndon, England Application December 12, 1955, Serial No. 552,350

Claims priority, application Great Britain December 31, 1954

3 Claims. (Cl. 172—77)

The invention relates to a rotary cultivating machine of the kind which is to be supported from or towed by a tractor and has an earth-working rotor connected to be driven from a power take-off shaft of the tractor, and which also has a lifting mechanism for raising the rotor clear of the ground and a ground-engaging means for controlling the depth of operation of the rotor.

The object of the invention is desirably to control the pressure, due to the weight of the machine, exerted on the ground by such depth control means.

According to the invention the lifting mechanism is associated with a resiliently-distortable means in which is stored at least some of the load which would otherwise have to be supported by the ground-engaging means.

In the case where the machine is supported from the back of a tractor (e.g., by a known form of three-point suspension means incorporating a power-operated lifting mechanism) the machine is raised bodily from the ground by the lifting mechanism; while in the case where the machine is towed by a tractor the machine includes a wheeled frame, and the lifting mechanism operates to raise a portion of the frame in which the rotor is journalled. In either case the lifting effort can, in accordance with a further feature, be transmitted to the rotor through a telescopic, screw-operated link incorporating a compression spring. In this way the lifting effort is transmitted through the spring, and by adjusting the link the spring can be made to absorb a desired proportion of the weight of the rotor and thus relieve the ground-engaging means of some of the load.

The said known form of three-point suspension means includes a pair of parallel, laterally-spaced, rearwardly-directed arms, having respective pivotal connections at their ends to the tractor and the machine, and a third arm centrally between, but above the said pair. This third arm also has pivotal connections at its ends to the tractor and machine, and, in a side view, the arms and their pivotal points provide an articulated parallelogram. A power-operated arm is connected by a link to one or both of the bottom arms so as to apply the lifting effort, and in accordance with yet another feature of the invention a resiliently-distortable means extends between the pivotal connection to the tractor of the said third arm and the machine in the region of the common axis of the pivotal connections thereto of the pair of arms so that, with the drive to the power-operated arm in neutral, the resiliently-distortable means supports a proportion of the weight of the rotor, and associated movable parts, and relieves some of the pressure which would otherwise have to be supported by the ground-engaging means.

Two methods of carrying out the invention are illustrated, by way of example, in the accompanying drawings. In the latter:

Figure 1 is a side elevation of a cultivating machine of the kind which is to be towed by a tractor;

Figure 2 is an enlarged view, partly in section, and of the resiliently-distortable means shown in Figure 1;

Figure 3 is a view similar to Figure 1 but of a cultivating machine of the kind which is to be supported by a tractor;

Figure 4 is a fragmentary view on the line 4—4 of Figure 3;

Figure 5 is an enlarged detail of a portion of Figure 4;

Figure 6 is a side elevational view of the cultivating machine with the earth-working tools and associated parts in raised position; and Figure 7 is a fragmentary top plan view of the device shown in Figure 6.

The cultivating machine shown in Figure 1 and which, of itself, forms no part of the present invention includes a draught tube 11 with a bracket 12 fast near its front end and for connection, by a universally-jointed hitch 13, to a towing bracket 13a of the tractor (not shown).

The draught tube 11 contains a suitably supported transmission shaft (not shown) which is driven from the tractor power take-off shaft through a telescopic shaft 14 with universal joints 14a, 14b at its ends. At its rear end the draught tube 11 is fast with a housing 15 which is intermediate, and fast with oppositely-extending cross-tubes (not shown) on the outer ends of which are journalled side frame members (of which the near-side one is shown at 16) between which is supported a transverse rotor with earth-working tools 17. The side frame member 16 contains chain and sprocket gearing through which the rotor is driven from a shaft in the appropriate cross-tube and, in turn, driven by the gearing in the housing 15.

Brackets (not shown), fast with the side frame members, support a pair of ground-engaging wheels 18 of which the axle is connected to a lever 19 by a link 20. This lever is pivoted at 19a and can be acted upon either by a manually-operable arrangement indicated generally at 21, or by a hydraulically-operable arrangement indicated generally at 22, for moving the assembly of the wheels 18, side frame members and rotor, arcuately about the pivot axis (indicated at 23) of the side frame members whereby to lift the rotor clear of the ground.

The rotor and the associated mechanism which pivots about the axis 23 is supported by any suitable means from the ground so that the depth of operation can be controlled. In the example shown this is done by a tail board 24a which is hinged from the bottom of the shield 24 and connected by a link 27 with alternative attachment points to a boom 28 fast with the casing 16. This form of ground-engaging means is the subject of my co-pending application S.N. 552,349, filed December 12, 1955, now abandoned, and forms no part of the present invention.

Fast with the draught tube 11 is a pillar 29 which is stayed at 30 and has a forked top where it pivotally supports a trunnion block 31. The trunnion block has a bore through which freely passes a rod 32 which is provided with a crank handle 33 and a screw-threaded portion 34 extending into a tube 35 of rectangular internal cross-section and forming part of the manually-operable means 21. This tube serves as a guide for a rectangular nut 36 (see Figure 2) in which the screw-thread 34 works. The crank handle 33 is preferably pivoted to the rod 32 at 37 so that it can be swung into an out-of-the-way position when not required for use.

A compression spring surrounding the rod is enclosed between a closed end 38 of the tube 35 and the nut 36, and in the example shown there are two such springs, 39 and 40, arranged one within the other. A nut 41 and washer 42 prevent the rod from screwing out of the nut 36. A thrust bearing 43 reacting between an enlargement 44 of the handle end of the rod, and the trunnion block 31 permits the rod to be turned by the handle while the rod is stressed by the weight of the rotor and associated movable parts.

It will be seen that when the rotor has been lowered for the ground-engaging means (e.g., the tail board 24a) of the depth control means to engage the ground, some of the ground-engaging pressure can be relieved by turning the rod 32 in the nut 36 whereby to absorb it in compressing the springs 39 and 40. In this way the effective pressure on the ground of the said ground-engaging means can be desirably reduced, for example, for not unduly compacting the earth tilled by the rotor.

If the rotor should be deflected upwards by some irregularity in the ground, the compression in the springs will first be relieved and then, if the deflection be a large one, the thrust bearing 43 will be lifted off the trunnion block 31 (as, of course, will also be the case when the rotor is raised by the hydraulic means 22).

The connection of the hydraulic means 22 to the lever 19 is by a lost motion connection indicated at 45, so that the hydraulic and manual means can be used independently.

The rotary cultivating machine shown in Figures 3 and 4 is supported in known manner from a tractor by a pair of parallel arms 46 and a centrally-disposed upper arm 47, these arms having respective pivotal connections 48 and 49 to the tractor gear casing 50, and having respective pivotal connections 51 and 52 to the cultivating machine frame. At least one of the lower arms 46 is acted upon, through a link 53, by a lever 54 which can be urged in either direction about its pivot 55 by a hydraulically-operated means (not shown) for raising and lowering the machine, the pivots 48, 49, 51 and 52 forming the angles of an approximate parallelogram which articulates during the raising and lowering movements.

Normally when the rotor has been lowered to an operative position limited by the ground-engaging means (which are shown as being of the same kind as in Figure 1, but can be of any suitable kind) the hydraulic drive to the lever 54 is disconnected so that the whole weight of the rotor and associated parts is supported by the ground-engaging means, the links 46 and 47 being freely movable about their pivots and merely maintaining the cultivating machine in its vertical position.

In accordance with the invention, however, part of the weight of the machine is supported by a resiliently-distortable means. For this purpose, and in the example illustrated, a yoke member has its ends anchored by rings 56 from the pivots 51 and has its bight located in an appropriately curved tube 57 supported from the pivot 49. Preferably the ends of this tube are flared as shown, and the engagement with the pivot 49 is by arms 58, 58 which are fast with the tube and journalled on the pivot pin 59.

The central portion of the yoke member is formed from a length of chain 60 which has its ends shackled at 61 to the adjacent ends of resiliently-extensible end portions connected to the rings 56 by rings 62. Each resiliently-extensible end portion includes a U-shaped anchor member 63 which has its bight engaged in the coacting ring 62 and extends through a coiled, compression spring 64, where the ends are out-turned at 65. A reversely directed U-shaped anchor member 66, with its arms in a plane at right-angles of the plane of the arms of the member 63, has its bight engaged in the loop 67 of the shackle 61 and, after extending through the spring 64, has its ends out-turned at 68. The arrangement is therefore such that, with the rotor in operative position and the hydraulic drive to the lever 54 in neutral, the yoke member will be extended to compress the springs 64 whereby the latter will absorb some of the load which would otherwise be applied to the ground-engaging means.

Preferably it is arranged for the chain 60 to have one or two spare links, indicated at 60a, for enabling the overall length of the yoke member to be adjusted by engaging the shackles with appropriate links of the chain.

Preferably, and as shown, the chain links are of keyhole formation so that a selected one can be inserted through an opening of the shackle and turned through 90° for anchoring purposes.

What I claim as my invention and desire to secure by Letters Patent of the United States is:

1. A rotary cultivating machine, of the kind which is to be towed by a tractor, comprising a frame, an earth-working rotor supported from said frame to be driven from a power take-off shaft of a tractor, a part, a pivot at one end of the part interconnecting said part and frame, a pair of coaxial road wheels journalled from said part remotely from said pivot, a lifting mechanism connected to act between said frame and said part to move said road wheels arcuately about said pivot for raising and lowering the rotor, and a ground-engaging means supported from said part for controlling the depth of operation of the rotor, said lifting mechanism including a pair of relatively telescopable members and a spring means supported by said members for opposing telescopic extension of the latter, said telescopable members and spring means constituting a resiliently-distortable means serving to absorb at least some of the load which would otherwise have to be supported by said ground-engaging means.

2. A rotary cultivating machine, of the kind which is to be towed by a tractor, comprising a frame, an earth-working rotor supported from said frame to be driven from a power take-off shaft of a tractor, a part, a pivot at one end of the part interconnecting said part and frame, a pair of road wheels carried by said part, a lifting mechanism connected to act between said frame and said part to move said road wheels arcuately about the pivot for raising and lowering the rotor, and a ground-engaging means supported from said part for controlling the depth of operation of the rotor, said lifting mechanism including a pair of relatively telescopable members and a spring means supported by said members for opposing telescopic extension of the latter.

3. A rotary cultivating machine, according to claim 2, in which one of the relatively telescopable members is a tube of non-circular cross-section and having an end wall, and the other telescopable member is a rod which extends slidably through a hole in said end wall and has a screw threaded portion working in a nut which is of equivalent shape to the cross-section of the tube and engages the interior wall thereof for relative sliding in the direction of the tube axis, the spring means being a coil spring arranged about the rod and having its ends engaged between said nut and end wall whereby to be compressed as the telescopable members are extended.

References Cited in the file of this patent

UNITED STATES PATENTS

| | | |
|---|---|---|
| 1,006,950 | Keddy | Oct. 24, 1911 |
| 2,366,386 | Clark | Jan. 2, 1945 |
| 2,558,822 | Claus | July 3, 1951 |
| 2,603,136 | Thomas | July 15, 1952 |
| 2,664,805 | Green et al. | Jan. 5, 1954 |
| 2,704,018 | Oehler et al. | Mar. 15, 1955 |